(12) United States Patent
Zhang et al.

(10) Patent No.: US 8,832,086 B1
(45) Date of Patent: Sep. 9, 2014

(54) METHOD AND SYSTEM FOR SEARCH LISTING PAGINATION

(75) Inventors: Zhiyu Zhang, Seattle, WA (US);
Alexander H. Wilkins, Seattle, WA (US); Xuan Li, Bellevue, WA (US);
Aaron D. Kujat, Issaquah, WA (US);
Weinan Wang, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 240 days.

(21) Appl. No.: 13/230,288

(22) Filed: Sep. 12, 2011

(51) Int. Cl.
*G06F 7/00* (2006.01)

(52) U.S. Cl.
USPC ............... 707/723; 707/725; 705/346

(58) Field of Classification Search
None
See application file for complete search history.

(56) References Cited

U.S. PATENT DOCUMENTS

| 2005/0075965 | A1* | 4/2005 | Cutler ............................ 705/37 |
| 2010/0257197 | A1* | 10/2010 | Hirayama et al. ............. 707/769 |
| 2011/0154259 | A1* | 6/2011 | Kennedy et al. ............. 715/811 |
| 2013/0007012 | A1* | 1/2013 | Selkowe Fertik et al. .... 707/748 |

* cited by examiner

*Primary Examiner* — Tony Mahmoudi
*Assistant Examiner* — Tuan-Khanh Phan
(74) *Attorney, Agent, or Firm* — McCormick, Paulding & Huber LLP (57) ABSTRACT

A system and method for search list pagination include sorting a set of records in an order based on a dynamic element of each of the records, and displaying the set of records in two or more pages on an interface. If the dynamic elements of any of the records changes between the display of the first page of records and the receipt of a request to display a second page of records on the interface, the method updates the ordering of the records to account for the change in the dynamic element of each of the records, and displays the second page sorted in the order. In such a manner, a user of the system or method may view each of the records sorted in the order, based on the instantaneous contents of the records.

20 Claims, 9 Drawing Sheets

FIG. 1

| Record No. (210) | Record Name (212) | Record Update Time (214) |
|---|---|---|
| 1 | Augusta | 06:26 |
| 2 | Baton Rouge | 06:29 |
| 3 | Chicago | 06:36 |
| 4 | Dallas | 06:39 |
| 5 | Hartford | 06:41 |
| 6 | Indianapolis | 06:47 |
| 7 | Jacksonville | 06:48 |
| 8 | Los Angeles | 06:55 |
| 9 | Minneapolis-St. Paul | 06:57 |
| 10 | Norfolk | 07:03  * token (230) |
| 11 | Olympia | 07:06 |
| 12 | Pasadena | 07:07 |
| 13 | San Juan | 07:11 |
| 14 | Topeka | 07:12 |

First Page of Records Requested (240): 07:15

FIG. 2A

| Record No. (210) | Record Name (212) | Record Update Time (214) |
|---|---|---|
| 1 | Augusta | 06:26 |
| 2 | Baton Rouge | 06:29 |
| 3 | Chicago | 06:36 |
| 4 | Dallas | 06:39 |
| 6 | Indianapolis | 06:47 |
| 7 | Jacksonville | 06:48 |
| 9 | Minneapolis-St. Paul | 06:57 |
| 10 | Norfolk | 07:03  * token (230) |
| 11 | Olympia | 07:06 |
| 12 | Pasadena | 07:07 |
| 13 | San Juan | 07:11 |
| 14 | Topeka | 07:12 |
| 8 | Los Angeles | 07:16 |
| 5 | Hartford | 07:18 |

Second Page of Records Requested (240): 07:20

| Order No. | Order Description | Quantity | Order Price | Date of Order Entry/Revision | Time of Order Entry/Revision | Unique Identifier |
|---|---|---|---|---|---|---|
| 001 | Concrete Mix | 12 bags | $ 36.00 | 07 Mar 2011 | 02:14 PM | 20110307141414001 |
| 004 | Treated Lumber | 120 l.f. | $2,000.00 | 07 Mar 2011 | 02:15 PM | 20110307141415004 |
| 009 | Curtain Wall | 10' x 24' | $9,600.00 | 07 Mar 2011 | 02:15 PM | 20110307141415009 |
| 008 | Molding, Decorative | 96 l.f. | $ 480.00 | 07 Mar 2011 | 02:19 PM | 20110307141419008 |
| 012 | Telecommunications Cables | 300' | $ 75.00 | 07 Mar 2011 | 02:20 PM | 20110307142020012 |
| 015 | PVC Pipe, 4" diam. | 4-50' secs. | $ 60.00 | 08 Mar 2011 | 06:41 AM | 20110308064101015 |
| 023 | Rebar, 1" braided | 160 l.f. | $ 55.00 | 08 Mar 2011 | 06:42 AM | 20110308064202023 |
| 024 | I-beam, W8x18 Sections | 2 x 14' | $ 950.00 | 08 Mar 2011 | 06:42 AM | 20110308064202024 |
| 027 | Paint, Navajo White | 6 gallons | $ 90.00 | 08 Mar 2011 | 06:45 AM | 20110308064505027 |
| 031 | Garage Door Opener, Standard | 3 | $ 450.00 | 08 Mar 2011 | 06:45 AM | 20110308064505031 |
| 032 | HVAC Unit | 1 | $3,000.00 | 08 Mar 2011 | 06:46 AM | 20110308064603032 |
| 033 | Flooring, Tile | 144 s.f. | $ 432.00 | 08 Mar 2011 | 06:47 AM | 20110308064703033 |
| 034 | Flooring, Linoleum | 196 s.f. | $ 392.00 | 08 Mar 2011 | 06:48 AM | 20110308064803034 |
| 037 | Masonry, Bricks | 444 units | $ 400.00 | 08 Mar 2011 | 06:48 AM | 20110308064803037 |
| 038 | Masonry, Cinder Blocks | 132 units | $ 165.00 | 08 Mar 2011 | 06:50 AM | 20110308065003038 |
| 042 | Railing, Indoor Stairs | 32 l.f. | $ 480.00 | 10 Mar 2011 | 03:26 PM | 20110310152603042 |
| 044 | Flooring, Parquet Wood | 212 s.f. | $2,120.00 | 10 Mar 2011 | 03:27 PM | 20110310152703044 |
| 045 | Security System Motion Sensor | 6 | $ 96.00 | 10 Mar 2011 | 03:27 PM | 20110310152703045 |
| 050 | Ceiling Fans, White | 4 | $ 400.00 | 10 Mar 2011 | 03:27 PM | 20110310152703050 |
| 051 | Ceiling Fans, Harvest Brown | 2 | $ 700.00 | 10 Mar 2011 | 03:28 PM | 20110310152803051 |

FIG. 5A

| Order No. | Order Description | Quantity | Order Price | Date of Order Entry/Revision | Time of Order Entry/Revision | Unique Identifier |
|---|---|---|---|---|---|---|
| 001 | Concrete Mix | 12 bags | $ 36.00 | 07 Mar 2011 | 02:14 PM | 20110307141414001 |
| 004 | Treated Lumber | 120 l.f. | $ 2,000.00 | 07 Mar 2011 | 02:15 PM | 20110307141415004 |
| 009 | Curtain Wall | 10' x 24' | $ 9,600.00 | 07 Mar 2011 | 02:15 PM | 20110307141415009 |
| 008 | Molding, Decorative | 96 l.f. | $ 480.00 | 07 Mar 2011 | 02:19 PM | 20110307141419008 |
| 015 | PVC Pipe, 4" diam. | 4-50' secs. | $ 60.00 | 08 Mar 2011 | 06:41 AM | 20110308064101015 |
| 023 | Rebar, 1" braided | 160 l.f. | $ 55.00 | 08 Mar 2011 | 06:42 AM | 20110308064202023 |
| 024 | I-beam, W8x18 Sections | 2 x 14' | $ 950.00 | 08 Mar 2011 | 06:42 AM | 20110308064202024 |
| 027 | Paint, Navajo White | 6 gallons | $ 90.00 | 08 Mar 2011 | 06:45 AM | 20110308064505027 |
| 031 | Garage Door Opener, Standard | 3 | $ 450.00 | 08 Mar 2011 | 06:45 AM | 20110308064505031 |
| 033 | Flooring, Tile | 144 s.f. | $ 432.00 | 08 Mar 2011 | 06:47 AM | 20110308064707033 |
| 034 | Flooring, Linoleum | 196 s.f. | $ 392.00 | 08 Mar 2011 | 06:48 AM | 20110308064808034 |
| 037 | Masonry, Bricks | 444 units | $ 400.00 | 08 Mar 2011 | 06:48 AM | 20110308064808037 |
| 038 | Masonry, Cinder Blocks | 132 units | $ 165.00 | 08 Mar 2011 | 06:50 AM | 20110308065003038 |
| 044 | Flooring, Parquet Wood | 212 s.f. | $ 2,120.00 | 10 Mar 2011 | 03:27 PM | 20110310152704 4 |
| 045 | Security System Motion Sensor | 6 | $ 96.00 | 10 Mar 2011 | 03:27 PM | 20110310152704 5 |
| 050 | Ceiling Fans, White | 4 | $ 400.00 | 10 Mar 2011 | 03:27 PM | 20110310152705 0 |
| 051 | Ceiling Fans, Harvest Brown | 2 | $ 700.00 | 10 Mar 2011 | 03:28 PM | 20110310152805 1 |
| 012 | Telecommunications Cables | 400' | $ 100.00 | 17 Mar 2011 | 07:48 AM | 20110317074801 2 |
| 032 | HVAC Unit | 2 | $ 6,000.00 | 17 Mar 2011 | 07:48 AM | 20110317074803 2 |
| 042 | Railing, Indoor Stairs | 48 l.f. | $ 720.00 | 17 Mar 2011 | 07:50 AM | 20110317075004 2 |

| Make | Model | Year | Miles | Price | Entry |
|---|---|---|---|---|---|
| Lexus | GX | 2009 | 31,000 | $39,999 | 25 Apr 2011 05:46 PM |
| Ford | Edge Limited | 2011 | 6,000 | $34,999 | 05 Apr 2011 06:07 PM |
| Chevrolet | Traverse | 2010 | 26,400 | $21,999 | 15 Apr 2011 01:01 PM |
| Toyota | Highlander | 2009 | 43,000 | $20,999 | 24 Apr 2011 08:30 AM |
| Ford | Explorer | 2008 | 29,000 | $18,250 | 23 Apr 2011 11:00 AM |
| Nissan | Murano | 2007 | 26,000 | $17,000 | 16 Apr 2011 06:30 PM |
| Toyota | RAV4 | 2010 | 17,900 | $16,500 | 12 Apr 2011 07:00 PM |
| Honda | Pilot | 2009 | 21,000 | $12,999 | 19 Apr 2011 11:35 AM |
| Honda | CR-V | 2009 | 25,500 | $11,999 | 21 Apr 2011 09:45 PM |
| Jeep | Grand Cherokee | 2005 | 112,500 | $9,999 | 24 Apr 2011 10:15 AM |
| Ford | Escape | 2008 | 32,000 | $8,999 | 23 Apr 2011 02:00 PM |
| Subaru | Forester | 2007 | 51,000 | $7,999 | 17 Apr 2011 09:30 AM |

Now Available - SUVs          page 1
- 2009 Lexus GX, 31,000 miles, only $39,999
- 2011 Ford Edge Limited, 6,000 miles, only $34,999
- 2010 Chevrolet Traverse, 26,400 miles, only $21,999
- 2009 Toyota Highlander, 43,000 miles, only $20,999
- 2008 Ford Explorer, 29000 miles, only $18,250

Now Available - SUVs    page 2
- 761 — 2007 Nissan Murano, 26,000 miles, only $17,000
- 762 — 2010 Toyota RAV4, 17,900 miles, only $16,500
- 763 — 2009 Honda Pilot, 21,000 miles, only $12,999
- 764 — 2009 Honda CR-V, 25,500 miles, only $11,999
- 765 — 2005 Jeep Grand Cherokee, 112,500 miles, only $9,999

770

Just Added - SUVs
- 771 — 2001 Acura MDX, 30,000 miles, only $33,999

700

| | Make | Model | Year | Miles | Price | Entry |
|---|---|---|---|---|---|---|
| 701 | Lexus | GX | 2009 | 31,000 | $39,999 | 25 Apr 2011 05:46 PM |
| 702 | Ford | Edge Limited | 2011 | 6,000 | $34,999 | 05 Apr 2011 06:07 PM |
| 721 | Acura | MDX | 2010 | 30,000 | $33,999 | 29 Apr 2011 12:00 PM |
| 703 | Chevrolet | Traverse | 2010 | 26,400 | $21,999 | 15 Apr 2011 01:01 PM |
| 704 | Toyota | Highlander | 2009 | 43,000 | $20,999 | 24 Apr 2011 08:30 AM |
| 705 | Ford | Explorer | 2008 | 29,000 | $18,250 | 23 Apr 2011 11:00 AM |
| 711 | Nissan | Murano | 2007 | 26,000 | $17,000 | 16 Apr 2011 06:30 PM |
| 712 | Toyota | RAV4 | 2010 | 17,900 | $16,500 | 12 Apr 2011 07:00 PM |
| 713 | Honda | Pilot | 2009 | 21,000 | $12,999 | 19 Apr 2011 11:35 AM |
| 714 | Honda | CR-V | 2009 | 25,500 | $11,999 | 21 Apr 2011 09:45 PM |
| 715 | Jeep | Grand Cherokee | 2005 | 112,500 | $9,999 | 24 Apr 2011 10:15 AM |
| | Ford | Escape | 2008 | 32,000 | $8,999 | 23 Apr 2011 02:00 PM |
| | Subaru | Forester | 2007 | 51,000 | $7,999 | 17 Apr 2011 09:30 AM |

METHOD AND SYSTEM FOR SEARCH LISTING PAGINATION

BACKGROUND OF THE INVENTION

Frequently, when a user requests to view large numbers of records displayed in a user interface, such as in response to a search request, the records are sorted in an order based on one or more sorting criteria and displayed in pages. Each of the pages displayed on a user interface may typically contain up to a predetermined maximum number of records, and the user may navigate between pages by selecting or activating links, buttons or other means that may be known to those of skill in the art. The maximum number of records that may be displayed on each page, and the sorting criteria, may be automatically set by the interface, or optionally set by the user.

When all of the data stored in each of the records to be displayed is static, paginating records is a simple and straightforward task. Records containing immutable data may be sorted according to one or more sorting criteria, divided into pages, and displayed page-by-page to the user. For example, where a user requests to view a set containing 157 records sorted by at least one sorting criteria, and a user interface may display a maximum of 50 records, a user may view three respective pages displaying records 1-50, 51-100 and 101-150, and a fourth page displaying records 151-157. To navigate from page to page, a user may select buttons or links reading "next 50," or "previous 50," to view and review each of the records contained in the set.

However, when at least some of the data stored in each of the records is dynamic, and subject to change, list pagination presents a challenging problem in that one or more records may escape review as a user advances from page to page, depending on the sort criteria chosen by the user. For example, where a set containing 38 records is sorted based on the time and date on which each record was last updated in an original list, and where records 1-10 of that set are displayed at time $t_0$, a request to display records 11-20 of that set made at time $t_1$ would skip a record if one of records 1-10 (e.g., record no. 7 of the original list) was updated between time $t_0$ and time $t_1$. Once record no. 7 of the original list is updated, and the request to display records 11-20 is received, the list of records would be reordered such that record no. 7 of the original list would immediately fall to the end of the sorted list and replace record no. 38 as the final record in the new list, while records 8-38 of the original list would advance forward to replace records 7-37 in the new list. Therefore, when the user requests to view records 11-20, the records displayed would correspond to the twelfth through twenty-first (12-21) records of the original list, and record no. 11 of the original list, which advanced forward to become record no. 10 of the new list, would not be displayed to the user.

The present invention is intended to overcome the aforementioned disadvantages of the prior art by providing an effective alternative to existing systems and methods for pagination, including search listing pagination of dynamic records.

BRIEF DESCRIPTION OF THE DRAWINGS

FIGS. 5A and 5B are lists of sorted and paginated records to be displayed in accordance with an embodiment of the present disclosure.

DETAILED DESCRIPTION

As is set forth in greater detail below, the present invention includes improved systems and methods for displaying paginated records in a sorted list. More particularly, the present invention is directed to systems and methods for search list pagination, and for displaying search results in paginated lists and ensuring that each of the results is displayed to a user.

According to one embodiment of the present invention, a record system provides a user interface that may display up to 25 records pertaining to a series of banking transactions in a paginated list. The records include the name of the payor or payee, the amount of the transaction and a memorandum line or other summary of the transaction. A user requests to view records pertaining to a set consisting of hundreds of transactions, sorted based on the date and time on which the records were most recently updated, with the record that was updated earliest listed first, and the later-updated records listed after sequentially after the earliest-updated record. Ten seconds after the user requests to view the records in the paginated list, one of the first 25 records that had been displayed to the user is updated. When the user then requests to review the next 25 records of the set, the system marks the last of the previously displayed records that has not been updated with a token, re-sorts the records, and displays the next 25 records in the set that were updated after the record that was marked with a token. In such a manner, the system ensures that the user is able to view all of the records in the set, instantaneously sorted based on the date and time on which the records were most recently updated.

According to another embodiment of the present invention, an auction web site permits customers to place bids on a variety of items posted at the site. The items may be viewed in an order based on any number of variables (e.g., cost, time remaining until each item's respective auction closes, or individual features of the respective items) which may be subject to change based on the addition or subtraction of items from the auction web site (e.g., when new items are made available, when old items are sold, or when an item's auction on the site expires). When a user visits the web site and enters a search request for the keywords "computer printer," the web site displays the first 50 individual computer printers that are available for bidding in a first area of the computer display, sorted by the highest bid price received to date, and the 50th printer in the list has a highest bid price of $199. Shortly after the user entered the keywords "computer printer," and viewed the first set of 50 printers, two of the printers listed in the first set were sold, and thus removed from the list. Additionally, the bid prices of three printers that were below $199 when the first set was displayed had since received bids that exceeded $199, and two additional printers having bid prices greater than $199 were newly made available at the web site after the first set was displayed. When the user requests to view the next 50 individual computer printers, sorted by highest bid price, the web site displays the 50 individual computer printers having highest bid prices of less than $199 in the first area of the computer display. The web site also displays the three printers which had bid prices below $199 when the first set was displayed, and the two additional printers which were added to the site and had bid prices greater than $199 after the user first made his request, in a second area of the computer display. Therefore, the systems and methods ensure that all of the computer printers available at the auction at the time the user requests to view the next 50 individual computer printers are ultimately displayed to the user in a paginated format, regardless of when the printers were added to the auction site, and regardless of any changes to the set of items corresponding to the keywords "computer printer," based on the addition of items to the web site, or the removal of items from the web site.

Accordingly, in accordance with one embodiment of the present invention, a system may display a set containing a relatively large number of records listed in multiple pages on a user interface. The records may include one or more elements of dynamic data that are subject to change, and the records may be sorted based on at least one of these elements and displayed in multiple pages. Where one or more of the elements of dynamic data changes in such a manner that would require a reordering of the sorted records, the systems and methods of the present invention ensure that none of the records is overlooked or omitted as the user advances from page to page, in order to display additional records, and that each of the records is ultimately displayed to the user. For example, the systems and methods of the present invention may mark or tag the last displayed record on a page that has not changed, and display the records that follow the marked record sequentially in order beginning on the next page. The systems and methods of the present invention may also determine whether any additional records have been added to the system since the search was performed, and display any new records in such a manner that ensures that a user is always able to view an entire set of records in a sorted, paginated list format, and that no record is ever overlooked or omitted in a display to the user.

The systems, computers, servers, and the like described herein have the necessary electronics, software, memory, storage, data sources, firmware, logic/state machines, microprocessors, communication links, displays or other visual or audio user interfaces, printing devices, and any other input/output interfaces to perform the functions described herein and/or achieve the results described herein.

In accordance with the systems and methods of the present invention, searches may be performed by any means known to those of skill in the art, such as the entry of one or more keywords or relevant numerical indicia into a text box or other interactive platform. The systems and methods described herein may be used to display records stored in one or more databases or like storage devices, and may include information presented in the form of tables, spreadsheets or other multidimensional formats. Furthermore, the systems and methods described herein may be used to present information in any form of interface, such as a user interface that enables the display of information to a user, or in an application programming interface that may enable one system or program to communicate with another system or program. As used herein, the term "dynamic record" refers to any item of information containing at least one element or aspect that may be subject to change, such as dates, times, prices or any other variable.

Users of the systems and methods of the present invention may operate any web-enabled or Internet applications, such as web browsers, interfaces or any other client-server applications or features including electronic mail or other messaging techniques to communicate with (or connect to) one or more system elements through the network. In addition, the computers and servers utilized in accordance with the present invention may include any of a number of computing devices that are capable of communicating over the network, including but not limited to set-top boxes, personal digital assistants, mobile phones including "smart" phones, digital media players, web pads, tablets, laptop computers, desktop computers, electronic book readers, and the like. The protocols and components for providing communication between such computers and servers are well known to those skilled in the art of computer communications and thus, need not be described in more detail herein.

The data and/or computer executable instructions, programs, firmware, software and the like (also referred to herein as "computer executable components") described herein may be stored on a computer-readable medium that is within or accessible by one or more computers or servers having sequences of instructions which, when executed by a processor (such as a central processing unit, or CPU), cause the processor to perform all or a portion of the functions and/or methods described herein. Such computer executable instructions, programs, software and the like may be loaded into the memory of computers and servers using drive mechanisms associated with the computer readable medium, such as a floppy drive, CD-ROM drive, DVD-ROM drive, network interface, or the like, or via external connections.

Figure 1:
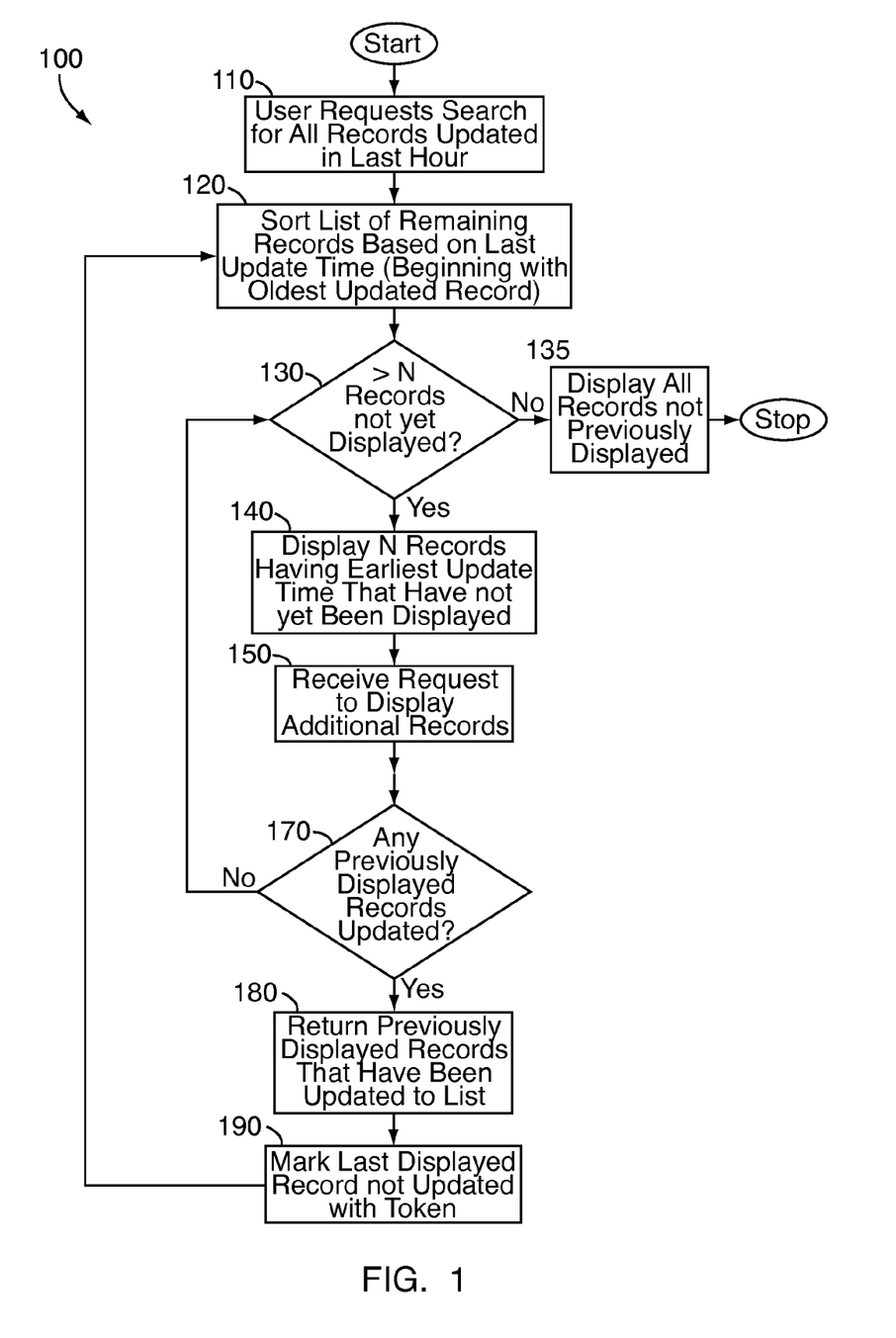
FIG. 1 is a flow chart of a method for displaying records in a list, in accordance with an embodiment of the present disclosure.

Referring to FIG. 1, a flow chart 100 of a process for search list pagination performed by a system according to one embodiment of the present invention is shown. The process represented by flow chart 100 begins at step 110, where a user performs a search for all records in a database that have been updated within a predetermined period of time, i.e., within the last hour. At step 120, the list of records returned in the search may be sorted based on the time that each record was most recently updated, with the record having the oldest update time listed first, and the records having the next-oldest update times listed sequentially thereafter.

At step 130, it is determined whether the number of records that have yet to be displayed is greater than the maximum number of records N that may be displayed on the page. If the number of records remaining to be displayed is less than or equal to N, all of the records not previously displayed will be displayed on the page at step 135. If, however, the number of records remaining to be displayed is greater than N, the system will display the N records that have the earliest update times and have not yet been displayed since their last update at step 140.

At step 150, the system receives a request from the user to display additional records that have not previously been displayed since their last update. At step 170, the system determines whether any of the records that have been previously displayed have been updated. If none of the previously displayed records has been updated, the process returns to step 130. If any of the previously displayed records has been updated, then the updated records are returned to the list of remaining records at step 180. At step 190, the last displayed record that has not been updated is marked with a token, and the records that have not yet been displayed and have been updated after the record marked with a token are re-sorted according to their last update time at step 120. The process shown in flow chart 100 continues until all of the records have been displayed as sorted by the time at which each record was updated last.

For purposes of illustration, many of the systems and methods described herein are referenced primarily in the context of a system for displaying records containing dynamic data that are sorted based on the time at which each record was most recently updated. As will be recognized by those of skill in the art, however, the systems and methods disclosed herein may also be used in numerous other environments. Moreover, the searches or requests to display sets of data may be received or performed on a single piece of hardware, i.e., a computer containing at least one processor and at least one database, and displayed on that single piece of hardware, and need not be transmitted over a network or between multiple individual pieces of hardware or users.

Figure 2A:
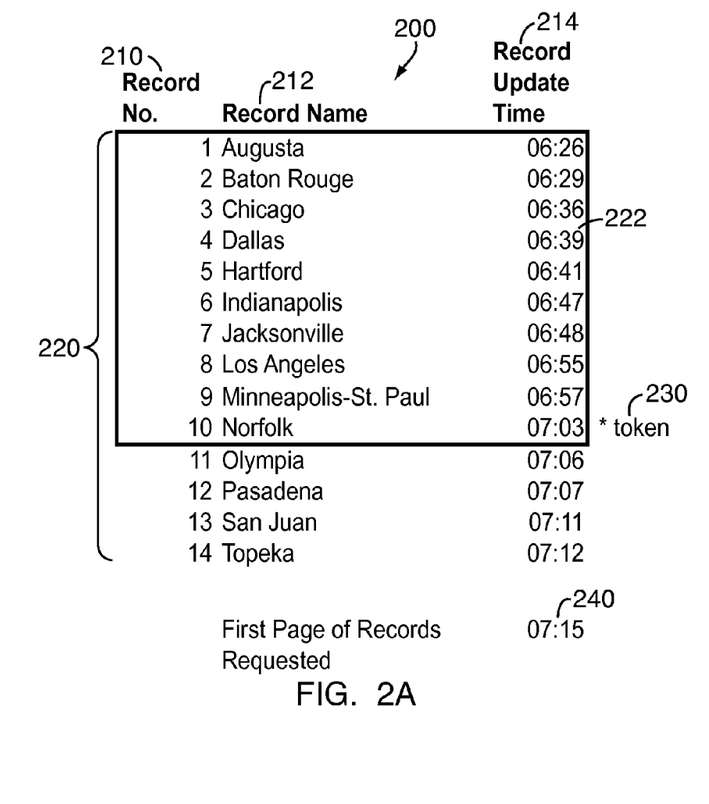
FIGS. 2A and 2B include sorted and paginated records to be displayed in a list, in accordance with an embodiment of the present disclosure.
Figure 2B:
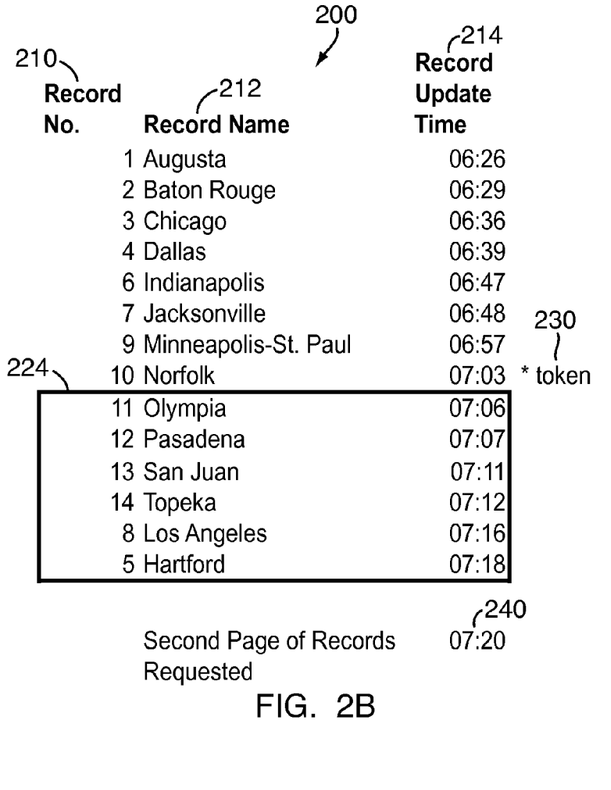

As is set forth above, one embodiment of the systems and methods of the present invention, such as the process shown in flow chart 100 of FIG. 1, may be used to display records containing dynamic data to a user in a specific order such that each of the records are displayed to the user and none of the records is either missed, skipped or overlooked, even if the order is based on a particular dynamic variable or element of data, and the value of that variable or element changes with respect to one or more records. Referring to FIGS. 2A and 2B, a table 200 containing records 220 is shown. The records 220 in table 200 may be displayed, for example, in accordance with one embodiment of a method of the present invention, such as steps 110-190 of the process shown in flow chart 100 of FIG. 1.

The data stored in each of the records 220 is listed in columns containing the record number 210, the record name 212 and the time 214 at which the record was last updated. The records 220 are to be displayed on pages that may include a maximum of ten records at one time. As is shown in FIG. 2A, a request 240 to display the first page 222 of records 220 was made at 7:15 a.m.

As is shown in FIG. 2A, the records 220 are shown as sorted based on the time 214, beginning with the oldest updated record (no. 1, Augusta), which was last updated at 6:26 a.m. Because the table 200 contains more than ten records, the first ten records are displayed in a first page 222. Five minutes after the first request to display records is received, or at time 7:20 a.m., a request 240 to display a second page 224 of records is received, and it is determined that two of the records (no. 8, Los Angeles, and no. 5, Hartford) have been updated since the first page of records was displayed. These records are returned to the list, and the last record that was not updated (no. 10, Norfolk) is marked with a token 230. The remaining records that have not been displayed since their last update are then sorted based on the last time 214 that each record was updated.

As is shown in FIG. 2B, the remaining six records that have not been displayed and have update times that are later than the update time of the record marked with a token 230 (no. 10, Norfolk) are shown on a second page 224. The records shown on the second page 224 are sorted by the time of their most recent update, and the two records (no. 8, Los Angeles, and no. 5, Hartford) that had been updated after the initial request to display records, and before the request to display additional records, are shown at the bottom of the page 224.

By marking the last displayed record with a token, and displaying the next set of records immediately after that token, one embodiment of the systems and methods of the present invention may ensure that each of the records is displayed to the user despite the dynamic nature of the variable by which the records are sorted (e.g., the time at which the records are last updated).

Figures 3A, 3B, 3C:
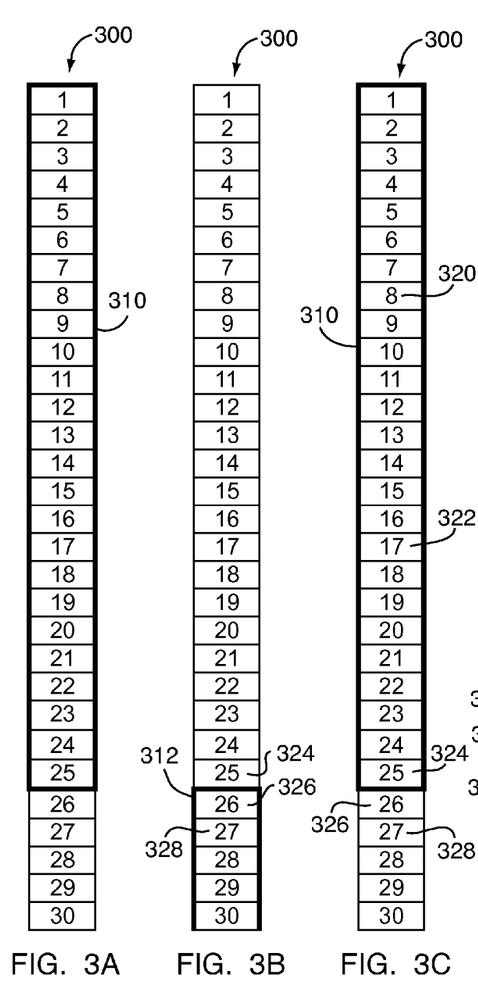
FIGS. 3A-3E include sorted and paginated records to be displayed in a list, in accordance with an embodiment of the present disclosure.

Some advantages of the systems and methods of the present invention are shown in FIGS. 3A-3E, which include various displays of a set 300 containing thirty records in pages of not more than twenty-five records. FIG. 3A shows the set 300 displayed sorted in order. Upon a request by a user, the first twenty-five records (e.g., records 1-25) of the set 300 may be displayed in a first page 310. Where the records contain merely static data, or where the records contain one or more elements of dynamic data that have not changed, a request to display the next set of records (e.g., records 26-30) results in the display shown in FIG. 3B, in which a second page 312 that begins with records 326, 328 which follow the last record 324 shown in the first page 310 is shown.

Figure 3D:
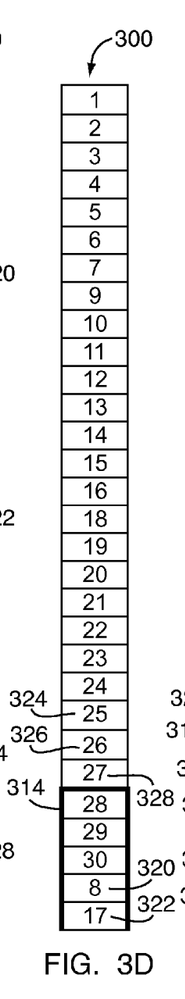

FIG. 3C shows the set 300 of records sorted based on one or more elements of dynamic data. After the time when the first page 310 of records is displayed and before a request to display additional records is received, records 320, 322 have been updated. According to the prior art, such as a structured query language (SQL) offset, a request to display additional records would result in the second page 314 shown in FIG. 3D, which includes the final five records of the set. However, because records 320, 322 shown in FIG. 3C were updated and re-sorted at the end of the set, as is shown in FIG. 3D, records 326, 328 advanced to the first set of twenty-five records, and the second page 314 does not include records 326, 328, which are never displayed to the user.

Figure 3E:
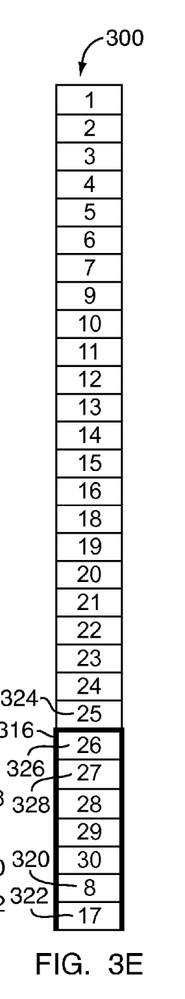

One or more embodiments of the systems and methods of the present invention may address disadvantages of the prior art, as is shown in FIG. 3E. According to the systems and methods of the present invention, when a user views the first page 310 of records shown in FIG. 3C, and requests to view additional records in the set, the systems and methods of the present invention may mark the last displayed record that has not been updated, i.e., record 324, with a token, and then re-sort the records that have either been updated or not yet displayed, and display a next subset 316 of records beginning immediately after the record 324 marked with a token, i.e., beginning with records 326, 328. In such a manner, records 320, 322 are displayed in their updated form, and records 326, 328 are presented in sorted order as the first records of the second page 316 following the record 324 marked with a token, and are not overlooked.

Figure 4:
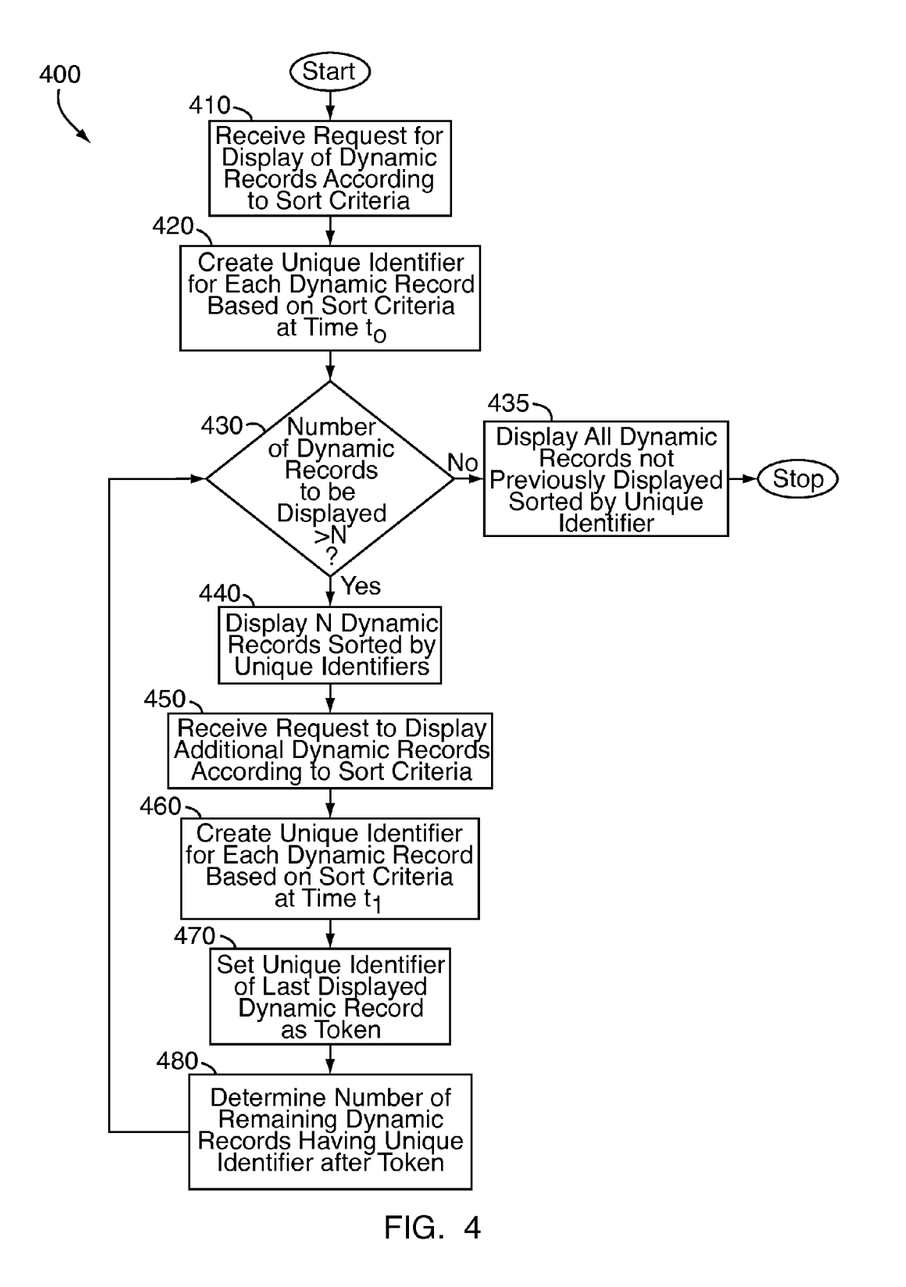
FIG. 4 is a flow chart of a method for displaying records in a list, in accordance with an embodiment of the present disclosure.

The tokens of the present invention may be used to designate a certain record shown in a list as a baseline for the display of subsequent records in another list, and may be a unique identifier formed from one or more aspects of the data stored in a record that is used to establish a sequential ordering of multiple records. Referring to FIG. 4, a flow chart 400 of a process according to another embodiment of the present invention is shown. The process begins at step 410, where a request to display dynamic records according to a sort criteria is received by the system from a user. A "sort criteria" may be any basis for sorting records containing data, such as alphabetically, logically, or ascending or descending values of one or more particular elements of data.

At step 420, a unique identifier is created for each dynamic record based on the sort criteria at time $t_0$. The unique identifier may be randomly selected, or may be formed from one element of data stored in the record, or by combining or concatenating two or more elements of the data. At step 430, it is determined whether the number of records that have yet to be displayed and have not yet been updated is greater than N, the maximum number of records that may be displayed on a page of an interface. If the number of records to be displayed is less than or equal to N, then the remaining dynamic records are displayed in a single page at step 435, sorted based on the unique identifiers in accordance with the sort criteria, and the process ends.

If the number of records remaining to be displayed is greater than N, then, at step 440, the next N dynamic records that have not yet been displayed since their last update are displayed, sorted by their respective unique identifiers. At step 450, the system receives another request from a user to display additional dynamic records according to the sort criteria. Therefore, at step 460, the system creates unique identifiers for each of the records based on the sort criteria at time $t_1$. At step 470, the system sets the unique identifier of the last dynamic that has been displayed as a token and, at step 480, determines the number of remaining dynamic records having unique identifiers that rank sequentially after the token before returning to step 430. The process shown in flow chart 400 continues until all of the records have been displayed as sorted based on the unique identifiers in accordance with the sort criteria.

The unique identifiers of the present invention may be formed from one variable, or from one or more variables combined or concatenated together. In such a manner, the unique identifiers may be a universal variable applied to each of the records and used to sort each of the records in a set. Referring to FIGS. 5A and 5B, a table 500 of records containing dynamic data is shown. The table 500 includes a plurality of orders for materials to be installed on a construction project. The orders in the table 500 are listed in columns, including the order number 510, the order description 512 (e.g., type of materials), the quantity 514, the order price 516, the date 518 and time 520 that the orders were entered or revised, and the unique identifier 522 for each order.

The unique identifiers 522 shown in FIGS. 5A and 5B are formed by concatenating the date 518 when the order was entered or revised, the time 520 when the order was entered or revised, and the order number 510. As is shown in FIGS. 5A and 5B, the unique identifiers 522 have the format YYYYMMDDHHMMXXX, where YYYYMMDD is the date 518 of the order (i.e., the four digits of the year, the two digits of the month and the two digits of the day when the order was entered or revised), HHMM is the time 520 of the order (i.e., the hour and minute when the order was entered or revised) and XXX is the order number 510. Therefore, each of the orders listed in table 500 has a distinct unique identifier 522, even if the orders were entered at the exact same time. For example, order no. 004 (Treated Lumber) and order no. 009 (Curtain Wall) were entered at 2:15 p.m. on Mar. 7, 2011. Therefore, the order for treated lumber has a unique identifier of 201103071415004 and the order for a curtain wall has a unique identifier of 201103071415009.

In such a manner, the records shown in table 500 may be sorted based on the unique identifiers 522 in the format YYYYMMDDHHMMXXX, because each of the records has a distinct unique identifier. By forming a unique identifier based on the time when the record was last updated and the record number, the records shown in table 500 may be sorted based on both the time of the last update and the order number.

The records shown in the table 500 of FIGS. 5A and 5B may be displayed in accordance with one embodiment of a method of the present invention, such as the process represented by the flow chart 400 shown in FIG. 4. If a first page containing the first thirteen records shown in FIG. 5A is displayed as sorted by the unique identifiers 522 at time $t_0$, and a request to display additional records is received at time $t_1$, then the unique identifiers will be calculated again, and the unique identifier 530 corresponding to order no. 034 (Linoleum Flooring), the thirteenth record shown in FIG. 5A, will be marked with a token. Next, if record nos. 012 (Telecommunications Cables), 032 (HVAC Unit) and 042 (Railing, Indoor Stairs) shown in FIG. 5A were updated between time $t_0$ and time $t_1$, then the unique identifiers 532, 534, 536 of those records will be updated.

Referring to FIG. 5B, the records in the table 500 are sorted according to the updated unique identifiers 522. In particular, because record nos. 012, 032 and 042 were updated, the respective unique identifiers 533, 535, 537 have been updated accordingly. A second page of additional records may be shown beginning with unique identifiers that are later than the unique identifier 530 of the first page that was marked with a token, as is shown in FIG. 5B, and the record nos. 012, 032, 042 that have been updated most recently are the last three records shown in the second page.

In addition to the displays of records shown in FIGS. 2, 3A-3E, 5A and 5B, which demonstrate displaying updated records that are sorted based on the ascending values of a variable, e.g., the time at which a record was last updated or a unique identifier of the record, the systems and methods of the present invention may be used to display records sorted based on non-ascending (or descending) values of variables, or records appear or are updated in such a manner that they would have appeared on a previous page. For example, where a series of records are displayed in a sorted order in a first portion of a screen, new or updated records that would have been listed higher in the sorted order could be displayed in a second portion of the screen, such that a user viewing records in the sorted order may be made aware of updated records that would be displayed in accordance with the sort criteria, and also of new and updated records that would have been displayed on pages that were previously viewed by the user.

Figure 6:
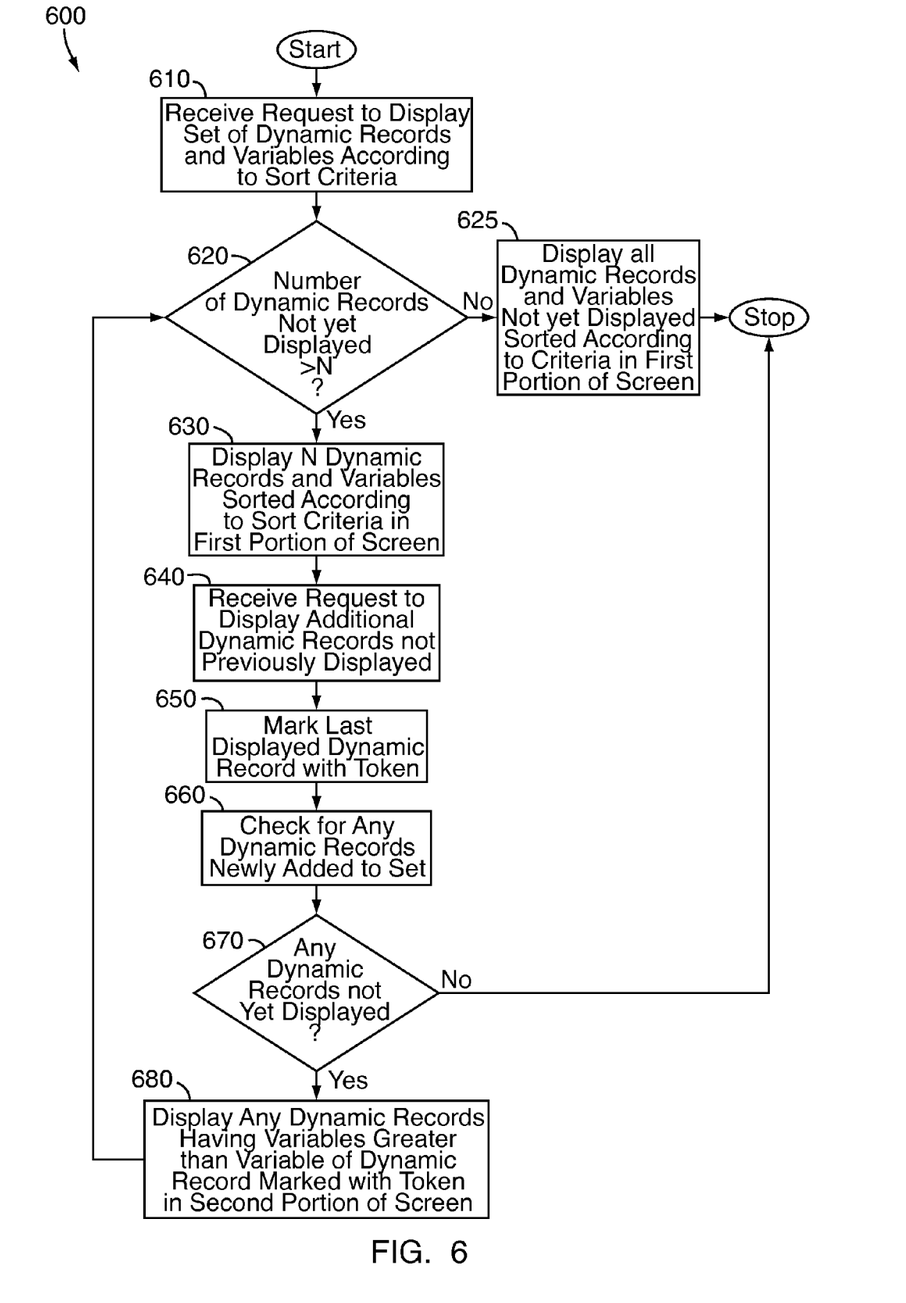
FIG. 6 is a flow chart of a method for displaying records in lists, in accordance with an embodiment of the present disclosure.

Referring to FIG. 6, a flow chart 600 of a process according to another embodiment of the present invention is shown. The process begins at step 610, where a request to display dynamic records and variables according to sort criteria is received by the system from a user. At step 620, it is determined whether the number of records that have yet to be displayed and have not yet been updated is greater than N, the maximum number of records that may be displayed on a page of an interface. If the number of records to be displayed is less than or equal to N, then the remaining dynamic records and variables are displayed in a single page at step 625, in accordance with the sort criteria, and the process ends.

If the number of records remaining to be displayed is greater than N, then, at step 630, the next N dynamic records and variables that have not yet been displayed are displayed in a first portion of a screen, sorted in accordance with the sort criteria. At step 640, a request to display additional dynamic records and variables that have not yet been displayed is received from a user. At step 650, the last displayed record is marked with a token. At step 660, it is determined whether any dynamic records have been added to the set, and at step 670, it is determined if any dynamic records have not yet been displayed. If all of the dynamic records have been displayed, then the process ends.

If there are any dynamic records that have not yet been displayed, then at step 680, the process displays dynamic records having variables greater than the variable of the dynamic record marked with a token, and returns to step 620. The process shown in flow chart 600 continues until all of the records have been displayed as sorted by the time at which each record was updated last.

Accordingly, an embodiment of a method of the present invention, such as the process shown in flow chart 600 of FIG. 6, may be used to not only re-order and display updated records in accordance with a sort criteria but also display new or updated records even if such records would not have ordinarily been displayed in accordance with the sort criteria.

Figure 7A:
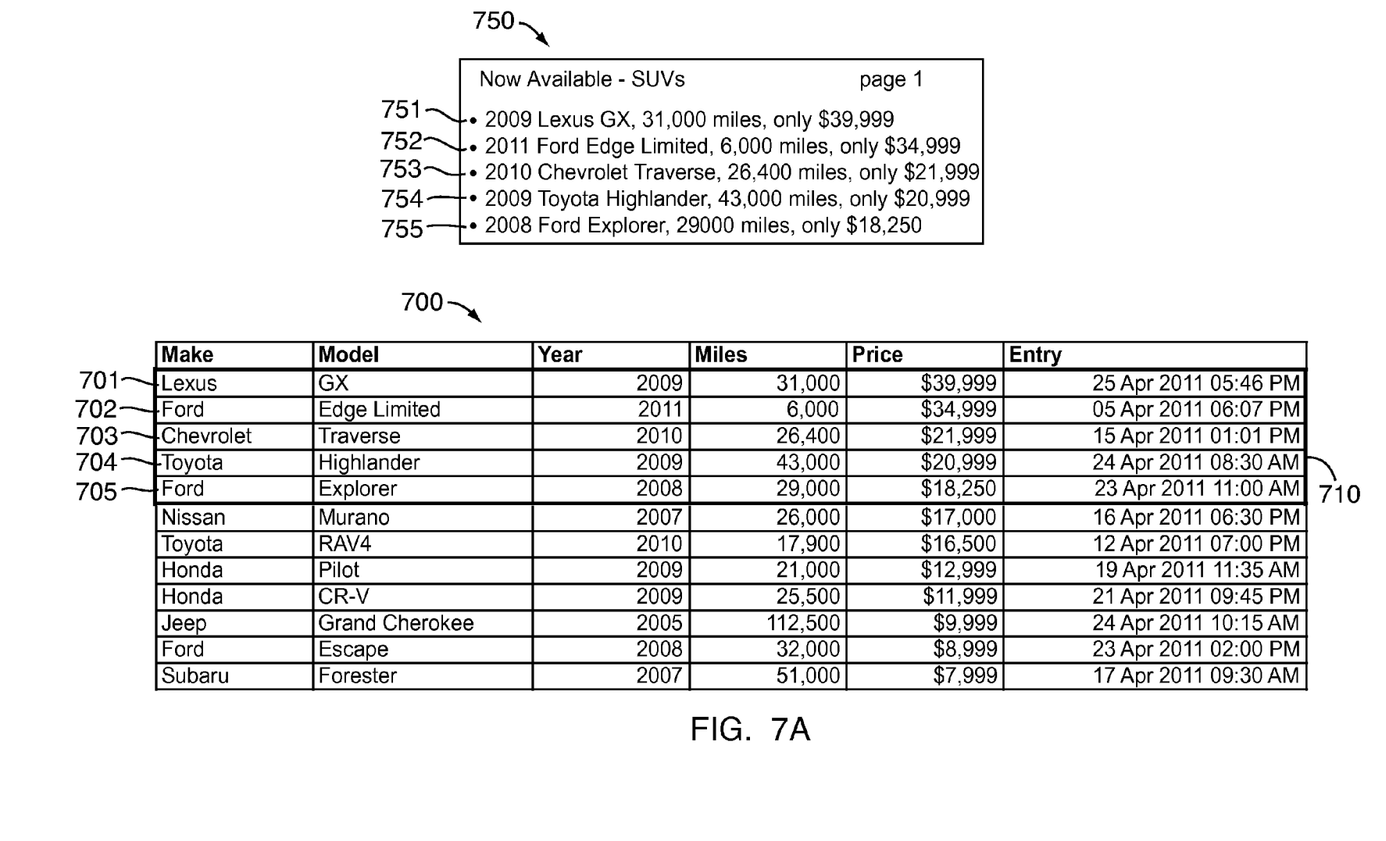
FIGS. 7A and 7B include lists of sorted and paginated records and displays of records, in accordance with an embodiment of the present disclosure.

Referring to FIG. 7A, a table 700 of records and a display 750 of items in a first portion of a screen corresponding to the records is shown. The table 700 contains twelve records pertaining to used sport/utility vehicles (SUVs) for sale, and the first five records 701-705 in the table 700, represented in page 710, correspond to the items 751-755 shown in the display 750. The table 700 includes columns according to the make, model, year, miles, price and entry time and date of each of the SUVs, and both the records in the table 700 and the items in the display 750 are sorted in a descending order, based on the prices of the SUVs.

Figure 7B:
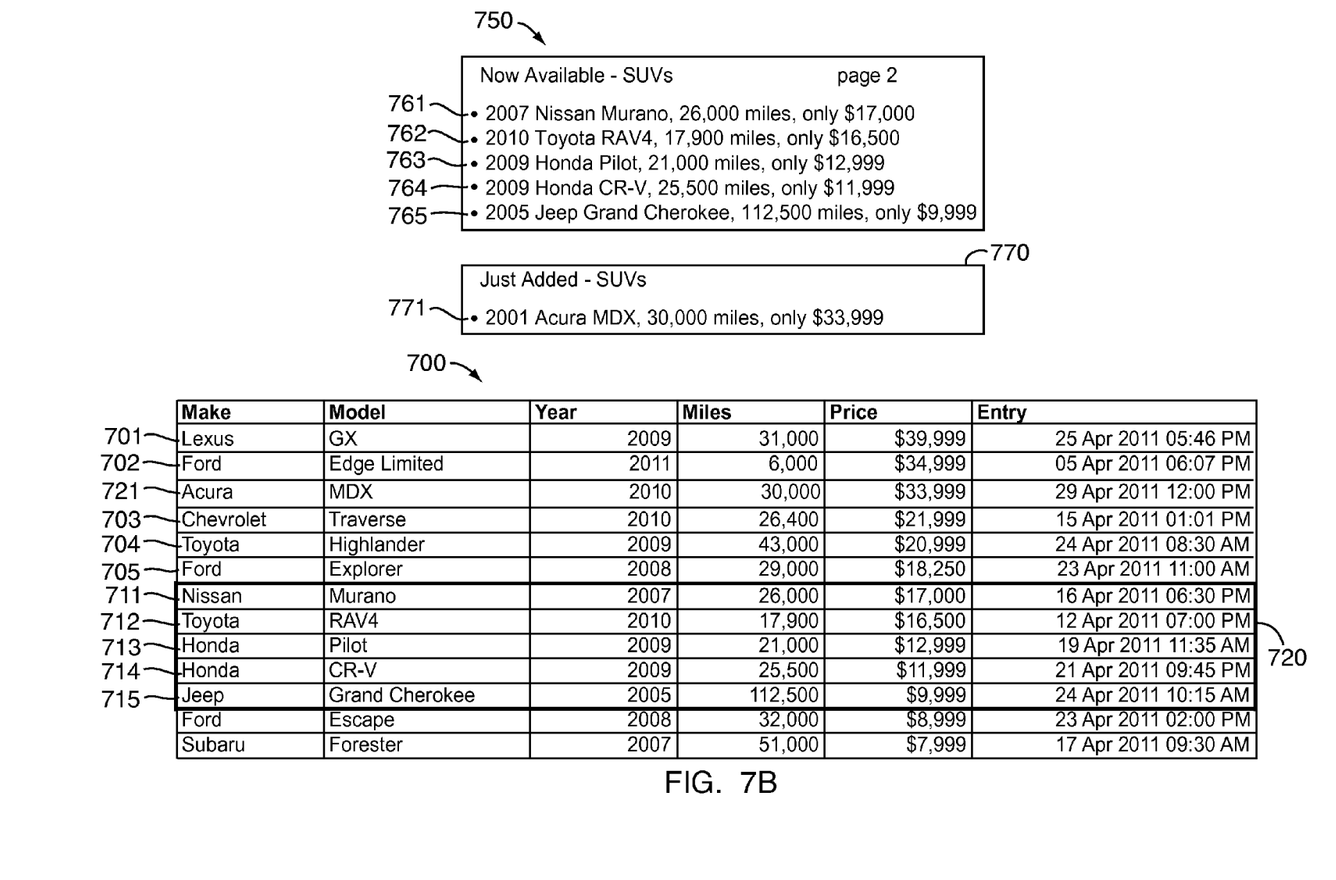

Between the time when a user requests the display of the records 701-705 in the table 700, and the time when a user requests the display of items corresponding to the next five records in the table 700, a new record corresponding to another used SUV is added to the table. Referring to FIG. 7B, the table 700 of records and the display 750 of items in the first portion of the screen corresponding to the records is shown. The table 700 contains thirteen records pertaining to used SUVs, including the twelve records shown in FIG. 7A and an additional record 721, which was newly added to the table 700. The records 711-715 shown in page 720 of table 700 of FIG. 7B also correspond to the items 761-765 shown in the display 750, upon the request of a user. Record 721, which would have been shown in the display 750 shown in FIG. 7A based on its price had it been entered into the table 700 at the time of the user's request, is shown in the display 770 of items in a second portion of the screen as item 771.

Therefore, the user who requested to view the records shown in FIGS. 7A and 7B, sorted by price, is not only able to view the remaining records in the table 700 in descending order but also able to view any additional records which were added to the table 700 after the initial request to view records was received. Accordingly, the systems and methods of the present invention provide a more versatile and complete account of the records contained in table 700 to a user, sorted according to his or her preferences, and makes the user aware of changes to the records that would not have been otherwise displayed to the user.

Although the foregoing examples are described in the context of sorting records in an ascending order, and by modifying the listing of records sorted in an ascending order by placing updated records at the end of the descending order, the systems and methods of the present invention may be modified to provide for the display of records ordered on any basis, i.e., ascending order, descending order, alphabetical order, logical order, or any other order. Moreover, although many of the foregoing examples are described in the context of sorting records based on a time at which each record was updated, the present invention is not so limited. Rather, the systems and methods of the present invention may be used to sort and display records based on any other variable, including times, dates, dimensions, prices or any other value that may be ordered.

Furthermore, although the disclosure has been described herein using exemplary techniques, algorithms, and/or processes, it should be understood by those skilled in the art that other techniques, algorithms and processes, or other combinations and sequences of the techniques, algorithms and processes described herein, may be used or performed in order to achieve the same function(s) and/or result(s) described herein, and are included within the scope of the present disclosure.

Any process descriptions, steps, or blocks in flow diagrams should be understood as potentially representing modules, segments, or portions of code which include one or more executable instructions for implementing specific logical functions or steps in a process, and alternate implementations are included within the scope of the preferred embodiments of the systems and methods for paginating records, such as search lists, may be deleted or executed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A non-transitory computer-readable medium having a computer-executable component for causing a computer system to perform a method for search list pagination, comprising:

receiving a search request from a user over a network;

identifying a plurality of records in response to the search request using at least one computer processor, wherein each of the records includes a dynamic element having a value;

arranging the plurality of records in an order based at least in part on the value, at a first time, of the dynamic element of each of the plurality of records using the at least one computer processor;

causing a display of a first search list page in a window on a computer display using the at least one computer processor, wherein the first search list page comprises a first portion of the plurality of records arranged in the order based at least in part on the value, at the first time, of the dynamic element of each of the plurality of records;

identifying at least one of the plurality of records on the first search list page using the at least one computer processor, wherein the value of the dynamic element of the at least one of the plurality of records on the first search list page changed after the plurality of records was arranged in the order based at least in part on the value, at the first time, of the dynamic element of each of the plurality of records;

arranging the plurality of records into the order based at least in part on the value, at a second time, of the dynamic element of each of the plurality of records, using the at least one computer processor; and causing a display of a second search list page in the window on the computer display using the at least one computer processor, wherein the second search list page comprises a second portion of the plurality of records arranged in the order based at least in part on the value, at the second time, of the dynamic element of each of the plurality of records; and wherein the value, at the second time, of a first record of the second search list page immediately follows the value, at the second time, of a last record of the first search list page in the order.

2. The medium according to claim 1, wherein the dynamic element is one of a date or a time.

3. The medium according to claim 1, wherein the order is a descending order.

4. A computer-implemented method for paginating records comprising:

receiving, at a first computing device, a first request from a second computing device to display at least a portion of a plurality of records on a computer display of the second computing device, wherein each of the records comprises a dynamic element having a value;

arranging, at the first computing device, the plurality of records according to an order based at least in part on the value, at a first time, of the dynamic element of each of the records;

causing a display of a first portion of the records arranged according to the order based at least in part on the value, at the first time, of the dynamic element of each of the plurality of records in a first window on the computer display of the second computing device;

identifying, at the first computing device, subsequent to the display of the first portion, a change in the value of the dynamic element of at least one of the records in the first portion;

receiving, at the first computing device, a second request from the second computing device to display at least a portion of the plurality of records on the computer display of the second computing device;

arranging, at the first computing device, the plurality of records according to the order based at least in part on the value, at a second time, of each of the records; and causing a display of a second portion of the records arranged according to the order based at least in part on the value, at the second time, of each of the records in the first window on the computer display of the second computing device, wherein the second portion includes the at least one of the records in the first portion for which the change in the value of the dynamic element was identified.

5. The method according to claim 4, further comprising:
receiving, subsequent to the display of the first portion of the records, information regarding an additional record;

determining whether the additional record would have been included in the first portion of the records sorted according to the order according to the sort criterion based at least in part on the values, at the first time, of each of the results of the search; and in response to determining that the additional record would have been included in the first portion of the records sorted according to the order according to the sort criterion based at least in part on the values, at the first time, of each of the results of the search, and causing, as the second portion of the records is displayed in the first window, the display of the additional record in a second window on the computer display.

6. The method according to claim 4, wherein the order is defined by a user of the second computing device.

7. The method according to claim 4, wherein a last record of the first portion precedes a first record of the second portion in the order at the second time.

8. The method according to claim 4, wherein the first portion includes a predetermined number of records.

9. The method according to claim 4, wherein the first portion includes a first number of records, and wherein the first number is defined by a user of the second computing device.

10. The method according to claim 4, wherein the order is one of an ascending order or a descending order.

11. The method according to claim 4, wherein the dynamic element is one of a price, a date, a time and an identifier of the record.

12. The method according to claim 4, wherein the dynamic element is a combination of one or more variables associated with the record.

13. The method according to claim 4, further comprising:
marking one of the first portion of the plurality of records with a token, wherein the marked one of the first portion is the last one of the first portion of the plurality of records arranged according to the order at the first time having a value of the dynamic element that has not changed.

14. A computer-implemented method for paginating records comprising:

identifying, using a computing device, a set of records stored in at least one database, wherein each of the records has a value associated therewith;

arranging, using the computing device, the set of records in an order, wherein the order is based at least in part on the values, at a first time, associated with each of the records in the set;

causing, using the computing device, a display of a first portion of the set of records arranged in the order;

adding, using the computing device, after arranging the set of records in the order, at least one new record to the set of records;

arranging, using the computing device, the set of records in the order based at least in part on the values, at a second time, associated with each of the records in the set;

receiving, using the computing device, a request to display a second portion of the set of records over a network; and causing, using the computing device, a display of the second portion of the records, wherein the second portion of the set of records follows the first portion of the set of records in the order, and wherein the second portion of the set of records includes the at least one new record.

15. The computer-implemented method according to claim 14, wherein the at least one new record would have been included in the first portion of the set of records if the at least one new record had been in the set of records at the first time.

16. The computer-implemented method according to claim 14, wherein the second portion of the set of records excludes each of the first portion of the set of records.

17. The computer-implemented method according to claim 14, wherein the value is one of a time, a date or a cost associated with the record.

18. A computer system having a computer comprising at least one computing device in communication with at least one database, wherein the computing device executes a computer program causing the computer system to perform a method comprising:

performing a search of records stored in the at least one database;

identifying a plurality of results of the search, wherein each of the results of the search includes a value;

receiving a sort criterion from the user;

sorting the plurality of results of the search in an order according to the sort criterion based at least in part on the values, at a first time, of each of the results of the search;

causing a display of a first portion of the results of the search sorted in the order in a window on a computer display;

identifying, following the display of the first portion of the results of the search, at least one of the first portion of the results of the search having a value that has changed;

receiving a request to display additional results of the search;

sorting the plurality of results of the search in the order according to the sort criterion based at least in part on the values, at a second time, of each of the results of the search; and causing a display of a second portion of the results of the search sorted in the order according to the sort criterion based at least in part on the values, at the second time, of each of the results of the search, in the window on the computer display, wherein the second portion of the results of the search includes the at least one of the first portion of the results having a value that has changed.

19. The system according to claim 18, wherein each of the records has a plurality of elements, and wherein the value is determined based on a combination of two or more elements of the record.

20. The system according to claim 18, wherein the method further comprises:

marking one of the first portion of the results of the search with a token, wherein the one of the first portion of the results of the search marked with the token is the last one of the first portion of the results of the search sorted in the order according to the sort criterion based at least in part on the values, at the first time, of each of the results of the search, having a value that has not changed.

* * * * *